United States Patent
Wood et al.

(10) Patent No.: US 11,327,201 B2
(45) Date of Patent: May 10, 2022

(54) POROSITY PREDICTION BASED ON EFFECTIVE STRESS

(71) Applicant: The Government of the United States of America, as represented by the Secretary of the Navy, Arlington, VA (US)

(72) Inventors: Warren Theodore Wood, Mandeville, LA (US); Kylara Margaret Martin, Round Rock, TX (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 472 days.

(21) Appl. No.: 15/799,494

(22) Filed: Oct. 31, 2017

(65) Prior Publication Data

US 2018/0120479 A1   May 3, 2018

Related U.S. Application Data

(60) Provisional application No. 62/415,267, filed on Oct. 31, 2016.

(51) Int. Cl.
    *G01V 99/00* (2009.01)
    *G01V 1/38* (2006.01)
    *G01N 15/08* (2006.01)

(52) U.S. Cl.
    CPC ......... *G01V 99/005* (2013.01); *G01N 15/088* (2013.01); *G01V 1/3808* (2013.01); *G01V 2210/6244* (2013.01); *G01V 2210/66* (2013.01)

(58) Field of Classification Search
    CPC .............. G01V 99/005; G01V 1/3808; G01V 2210/6244; G01V 2210/66; G01N 15/088
    See application file for complete search history.

(56) References Cited

U.S. PATENT DOCUMENTS

| 8,194,307 B2 * | 6/2012 | Arnold | G02B 3/0087 |
| | | | 359/307 |
| 2002/0169559 A1 * | 11/2002 | Onyia | G01V 1/32 |
| | | | 702/14 |

(Continued)

OTHER PUBLICATIONS

Yang, Yunlai, and Andrew C. Aplin. "Definition and practical application of mudstone porosity—effective stress relationships."; Petroleum Geoscience 10, No. 2 (2004): 153-162. (Year: 2004).*

(Continued)

*Primary Examiner* — Chuen-Meei Gan
(74) *Attorney, Agent, or Firm* — US Naval Research Laboratory; Nigel Fontenot

(57) ABSTRACT

Systems and methods relate to generating a self-consistent sediment model. Initially, void ratio extrema are determined for each sediment layer in a sediment column based on historical data or a direct measurement of the sediment column. Initial stress is determined for each sediment layer based on the void ratio extrema. A porosity model is generated for each sediment layer based on the void ratio extrema and the initial stress. At this stage, measured data is obtained for each sediment layer from a data collection device positioned at or near a geographic location of the sediment column. The porosity model of each of the sediment layer is combined with the measured data of the sediment layer to generate the self-consistent sediment model for each sediment layer. The porosity model and the self-consistent sediment model of each sediment layer is updated based on updated measured data obtained from the data collection device.

20 Claims, 6 Drawing Sheets

(56) References Cited

U.S. PATENT DOCUMENTS

| | | | | |
|---|---|---|---|---|
| 2014/0067351 A1* | 3/2014 | Gray | G01V 99/005 | 703/6 |
| 2014/0142853 A1* | 5/2014 | Daigle | G01N 15/088 | 702/2 |
| 2015/0066459 A1* | 3/2015 | Flemings | E21B 43/00 | 703/2 |
| 2015/0301223 A1* | 10/2015 | Xu | G01V 1/50 | 703/2 |
| 2016/0040531 A1* | 2/2016 | Ramakrishnan | G01V 1/40 | 702/8 |

OTHER PUBLICATIONS

Martin, Kylara, and Warren Wood. "A new model of marine sediment compression." Earth and Planetary Science Letters 477 (2017): 21-26. (Year: 2017).*

Martin, Kylara M., Warren T. Wood, and Joseph J. Becker. "A global prediction of seafloor sediment porosity using machine learning." Geophysical Research Letters 42, No. 24 (2015): 10-640. (Year: 2015).*

Martin, Theodore P., Michael Nicholas, Gregory J. Orris, Liang-Wu Cai, Daniel Torrent, and JoséSánchez-Dehesa. "Sonic gradient index lens for aqueous applications." Applied Physics Letters 97, No. 11 (2010): 113503. (Year: 2010).*

Waite, William F., J. Carlos Santamarina, Douglas D. Cortes, Brandon Dugan, David N. Espinoza, J. Germaine, Jaewon Jang et al. "Physical properties of hydrate-bearing sediments." Reviews of geophysics 47, No. 4 (2009). (Year: 2009).*

Yun, Tae Sup, Guillermo A. Narsilio, J. Carlos Santamarina, and C. Ruppel. "Instrumented pressure testing chamber for characterizing sediment cores recovered at in situ hydrostatic pressure." Marine Geology 229, No. 3-4 (2006): 285-293. (Year: 2006).*

Cubrinovski, Misko, and Kenji Ishihara. "Maximum and minimum void ratio characteristics of sands." Soils and foundations 42, No. 6 (2002): 65-78. (Year: 2002).*

Kushnareva, E. S., and E. A. Voznesensky. "Concept of critical void ratio used in estimating dynamic stability of sands." Moscow University Geology Bulletin 64, No. 2 (2009): 116-122. (Year: 2009).*

Zhang, Jia-Jia, Hong-Bing Li, and Feng-Chang Yao. "Rock critical porosity inversion and S-wave velocity prediction." Applied Geophysics 9, No. 1 (2012): 57-64. (Year: 2012).*

Archie, G. E. (1942), The electrical resistivity log as an aid in determining some reservoir characteristics, Pet. Trans. AiME, 146, 54-62, doi:10.2118/942054-G.

Butterfield, R. (1980), A natural compression law for soils(an advance on e-log p'), Geotechnique, 29(4), 469-480, doi:10.1680/geot.1979.29.4.469.

Collett, T. S., and J. Ladd (2000), Detection of Gas Hydrate with Downhole Logs and Assessment of Gas Hydrate Concentrations (Saturations) and Gas Volumes on the Blake Ridge with Electrical Resistivity Data, Proc. Ocean Drill. Program, Sci. Results, 164, 179-191, doi:10.2973/odp.proc.sr.164.219.2000.

Dugan, B. (2012), Petrophysical and consolidation behavior of mass transport deposits from the northern Gulf of Mexico, IODP Expedition 308, Mar. Geol., 315-318, 98-107, doi:10.1016/j.margeo.2012.05.001.

Dvorkin, J., M. Prasad, A. Sakai, and D. Lavoie (1999), Elasticity of marine sediments: Rock physics modeling, Geophys. Res. Lett., 26(12), 1781-1784.

Flemings, P. B., C. John, J. Behrmann, and 308 Scientists Expedition (2012), Expedition 308 synthesis: overpressure , consolidation , and slope stability on the continental slope of the Gulf of Mexico, Proc. IODP, 308, doi:10.2204/iodp.proc.308.215.2012.

Goto, S., and O. Matsubayashi (2009), Relations between the thermal properties and porosity of sediments in the easter flank of the Juan de Fuca Ridge, Earth Planets Sp., 61(7), 863-870.

Helgerud, M. B., J. Dvorkin, A. Nur, A. Sakai, and T. Collett (1999), Elastic-wave velocity in marine sediments with gas hydrates: Effective medium modeling, Geophys. Res. Lett., 26(13), 2021-2024.

Kinoshita, M., Tobin, H., Ashi, J., Kimura, G., Lallemant, S., Screaton, E.J., Curewitz, D., Masago, H., Moe, K.T., and the Expedition 314/315/316 Scientists, 2009. Proc. IODP, 314/315/316: Washington, DC (Integrated Ocean Drilling Program Management International, Inc.). doi:10.2204/iodp.proc.314315316. 2009.

Long, H., P. B. Flemings, J. T. Germaine, and D. M. Saffer (2011), Consolidation and overpressure near the seafloor in the Ursa Basin, Deepwater Gulf of Mexico, Earth Planet. Sci. Lett., 305(1-2), 11-20, doi:10.1016/j.epsl.2011.02.007.

Revil, A., and L. M. Cathles (1999), Permeability of shaly sands, Water Resour. Res., 35(3), 651-662.

Waite, W. F. et al. (2009), Physical Properties of Hydrate-Bearing Sediments, , (2008), 1-38, doi:10.1029/2008RG000279.Table.

* cited by examiner

POROSITY PREDICTION BASED ON EFFECTIVE STRESS

CROSS-REFERENCE TO RELATED APPLICATIONS

This Application is a non-provisional application claiming priority to provisional application 62/415,267 filed on Oct. 31, 2016, under 35 USC 119(e). The entire disclosure of the provisional application is incorporated herein by reference.

BACKGROUND

Physical models of seafloor density, sound speed, thermal conductivity, electrical resistivity and other properties depend significantly on porosity. Sound speed and shear speed also depend significantly on vertical effective stress, critical porosity, and temperature. Knowing the stress-strain relationship for each layer in a column of sediment, allows estimation of the porosity (or equivalently, void ratio) from deposition at the seafloor to deep burial. Porosity estimates can be used to determine numerous sediment geophysical parameters and implement existing models, such as sediment physics models, thermal property models, permeability models, and resistivity models, which can be combined to create an extensive physical model of the sediment.

The expression for the compression of marine sediment during normal consolidation can be based on the change in void ratio being proportional to the base 10 logarithm of the vertical effective stress:

$$e_2 = e_1 - C_i \log_{10}(\sigma) \quad (1)$$

where $C_i$ is the constant of proportionality also called the compression index, and $e_1$ and $e_2$ are the initial and final void ratios. The vertical effective stress, $\sigma$, is the load supported by the grains, equal to the difference between the lithostatic pressure and the pore pressure. In Equation 1, $C_i$ is an empirical constant, equal to the slope of the stress-strain curve for a given sediment type and void ratio.

SUMMARY

Embodiment relate to generating a self-consistent sediment model. Initially, void ratio extrema are determined for each sediment layer in a sediment column based on historical data or a direct measurement of the sediment column. Initial stress is determined for each sediment layer based on the void ratio extrema. A porosity model is generated for each sediment layer based on the void ratio extrema and the initial stress. At this stage, measured data is obtained for each sediment layer from a data collection device positioned at or near a geographic location of the sediment column. The porosity model of each of the sediment layer is combined with the measured data of the sediment layer to generate the self-consistent sediment model for each sediment layer. The porosity model and the self-consistent sediment model of each sediment layer is updated based on updated measured data obtained from the data collection device.

DESCRIPTION

Figure 3:
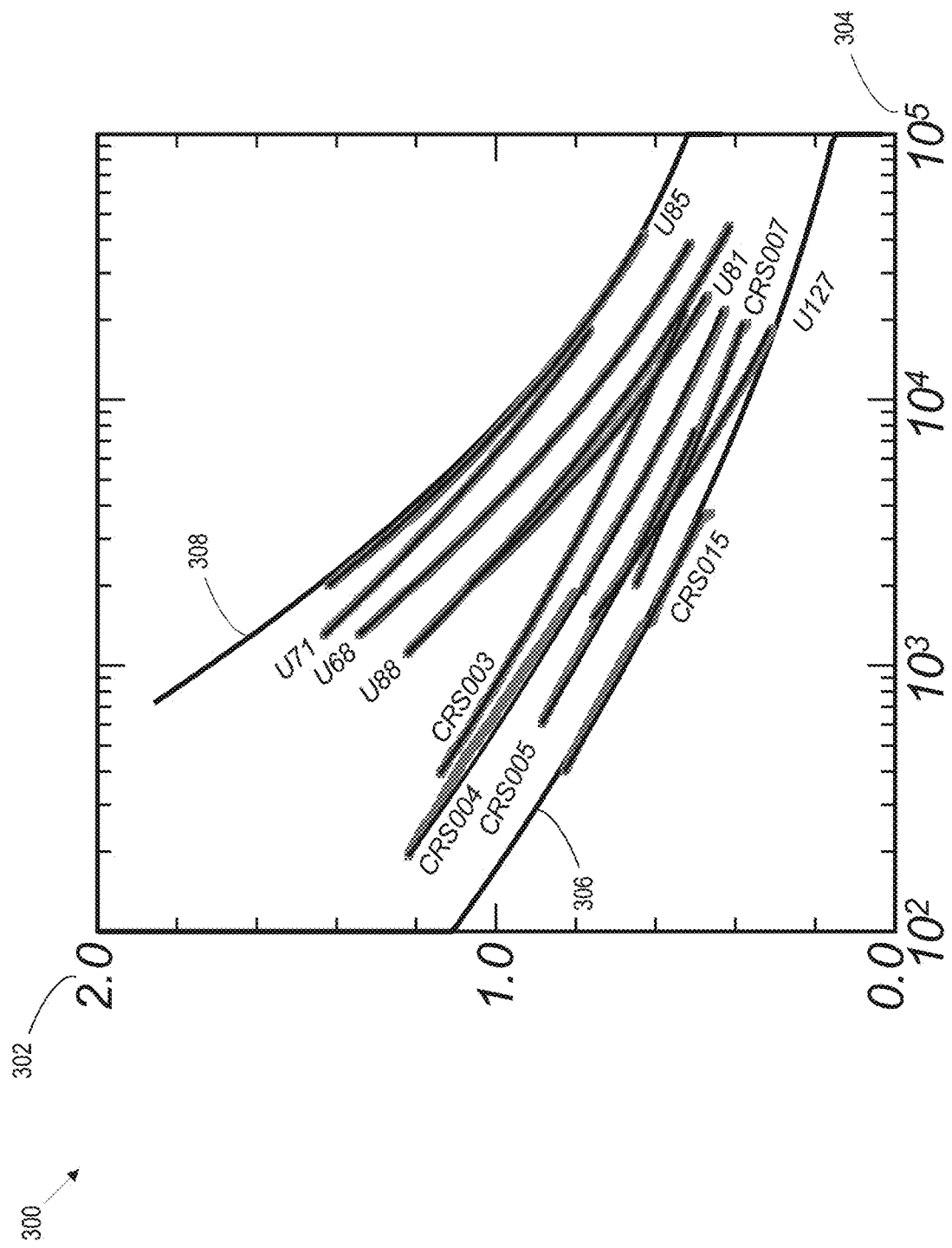
FIG. 3 is an example graph showing the compaction behavior in e-log($\sigma$) space.

It has been observed that the stress-strain curve, or e-log($\sigma$) (from Equation 1) curve, is concave upward as in FIG. 3, implying that $C_i$ (constant of proportionality) is actually a function of void ratio. Void ratio (or, equivalently, porosity) is a major controlling parameter in models of seafloor density, sound speed, thermal conductivity, electrical resistivity and many other properties. Embodiments of the invention use an empirical model of marine sediment compaction that is based on expressing the void ratio of the sediment as a fraction of the difference between its depositional maximum at the sea floor ($e_0$) and its minimum residual at depth ($e_r$). The values of $e_0$ and $e_r$ (corresponding to porosity values $\phi_o$ and $\phi_r$) are assumed to be inherent characteristics of the sediment type. This empirical model better fits existing laboratory compaction test data and, therefore, improves porosity estimates for the purposes of more complex physical models. In particular, it allows a single model to be used for the full range of compaction, whereas a single value of C is only appropriate over a small range of void ratios.

To determine the functional form of $C_i$, it is assumed that the dominant method of porosity reduction due to increased vertical effective stress is by the re-arrangement of grains through bending and sliding with no significant crushing or melting. $\phi_o$ is defined as the porosity at which the sediment falls out of suspension (i.e., critical porosity). The vertical effective stress at $\phi_o$ is $\sigma_o$, which is not equal to zero but is very small. The particular value of $\sigma_o$ is important for determining the starting point of a stress-strain curve as described below.

$\phi_r$ is defined as the residual porosity, which is the porosity at which the grains have been re-arranged to their maximum packing efficiency. Beyond this limit, the dominant method of porosity reduction is the crushing, melting, or chemical alteration of individual grains. The proportional porosity, $\phi_p$, is defined as the fraction of the way from $\phi_o$ to $\phi_r$ or equivalently for void ratio, $e_o$ to $e_r$ ($\phi_p = (\phi - \phi_r)/(\phi_o - \phi_r)$ and $e_p = (e - e_r)/(e_o - e_r)$). As discussed below, the compression index is extremely well represented (better than any existing observation) by the square root of the proportional void ratio;

$$C_i(e) = (e_p)^{1/2} = [(e - e_r)/(e_o - e_r)]^{1/2}. \quad (2)$$

No physical justification is offered for this functional form because it is entirely empirical. However, it offers a significant advantage over previous forms in that it is everywhere geologically reasonable. Neither negative nor infinite void ratios are ever encountered for any stress. Equation 2 now gives us an expression for the slope at any point along the stress-strain curve. Letting $g = \log_{10}(\sigma)$, and putting Equation 1 in differential form yields:

$$de = -C_i(e) dg = -[(e - e_r)/(e_o - e_r)]^{1/2} dg.$$

Substituting $a = 1.0/(e_o - e_r)$ and $b = -e_r/(e_o - e_r)$ produces:

$$de = -(ae + b)^{1/2} dg.$$

Accumulating terms of "e" on one side yields:

$$dg = -\frac{1}{\sqrt{ae+b}}de.$$

Integrating both sides yields $$g = -\frac{2\sqrt{ae+b}}{a} + C,$$

where C is the constant of integration. When $e=e_r$, $ae_r+b=0$, and $C=g_r=\log_{10}(\sigma_r)$, i.e., the constant of integration is the $\log_{10}$ of the vertical effective stress required to reach the minimum void ratio. So $$g = g_r - 2(ae+b)^{1/2}/a \text{ or}$$

$$\log_{10}(\sigma) = \log_{10}(\sigma_r) - 2(ae+b)^{1/2}/a \quad (3a)$$

$$e = a^{-1}[(a\log_{10}(\sigma_r/\sigma)/2)^2 - b] \quad (3b)$$

$$e = \frac{1}{4(e_0 - e_r)}\log_{10}^2\left(\frac{\sigma_r}{\sigma}\right) + e_r \quad (3c)$$

At maximum void ratio ($e=e_o$), $ae_o+b=1$, $g_o=g_r-2/a$, and $$e = \frac{1}{4(e_0 - e_r)}\left[\log_{10}\left(\frac{\sigma_0}{\sigma}\right) + 2(e_0 - e_r)\right]^2 + e_r \quad (4a)$$

Expanding and simplifying yields $$e = \frac{1}{4(e_0 - e_r)}\log_{10}^2\left(\frac{\sigma_0}{\sigma}\right) + \log_{10}\left(\frac{\sigma_0}{\sigma}\right) + e_0 \quad (4b)$$

Equations 3 and 4 are closed form expressions for vertical effective stress as a function of void ratio and vice versa. Only three parameters are required to span the spaces described in these equations, namely $e_o$, $e_r$, and $\sigma_o$ or $\sigma_r$. Relating $e_o$ to $\sigma_o$, reduces the necessary parameters to two.

Figure 1:
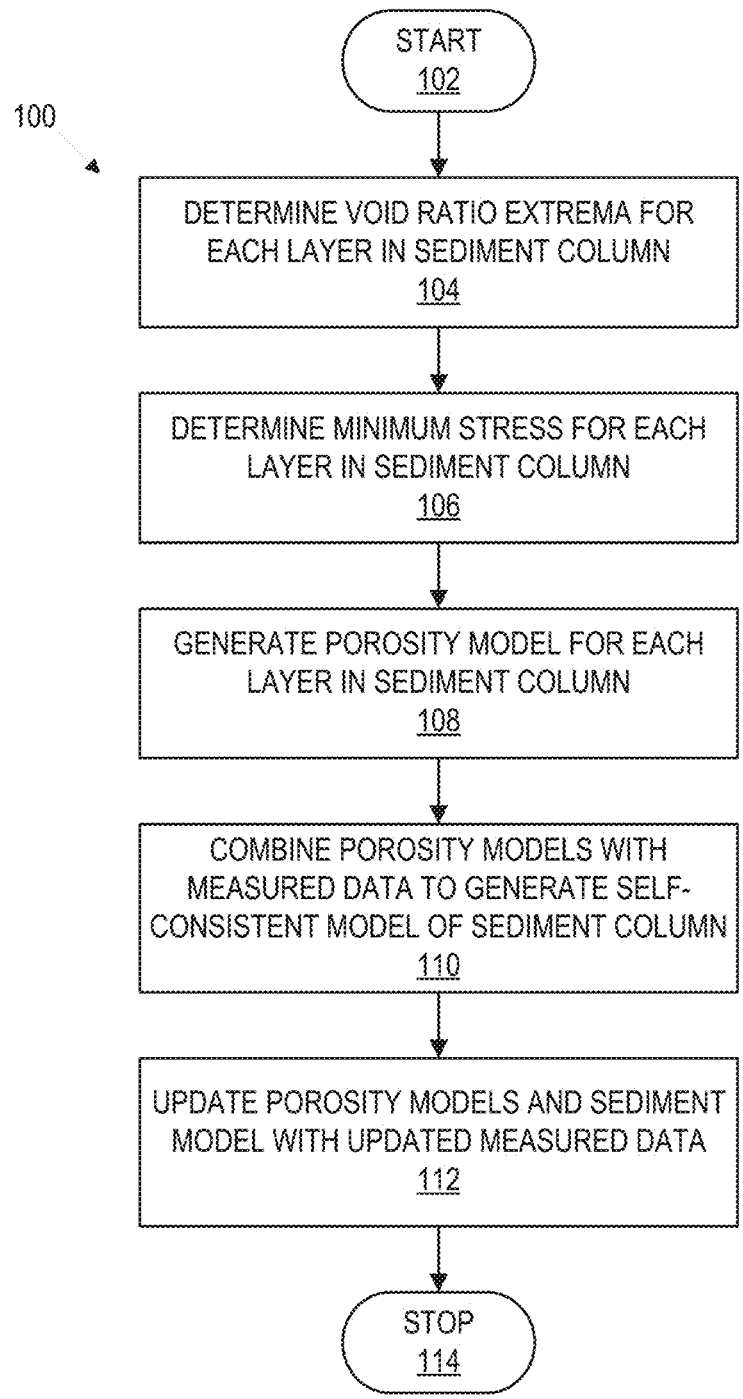
FIG. 1 is an example workflow for porosity prediction based on effective stress.

FIG. 1 an example workflow for porosity prediction based on effective stress. As is the case with the other processes described herein, various embodiments may not include all of the steps described below, may include additional steps, and may sequence the steps differently. Accordingly, the specific arrangement of steps shown in FIG. 1 should not be construed as limiting the scope of porosity prediction based on effective stress.

In block 102, the method starts and proceeds to block 104, where a void ratio can be determined for each sediment layer in a sediment column. Void ratio is the ratio between the volume of void space (porosity) and the volume of solids (1−porosity). The void ratio can be determined based on direct measurement or historical data from similar sediment layers. Specifically, each sediment layer can be identified as a particular composition of sand, silt, clay, soil, etc. (e.g., clays and sands exhibit $\phi_o/\phi_r$ of 0.85/0.05 and 0.40/0.25 respectively), which has a corresponding porosity according to the historical data. A sediment column is a volume of earth below a given area, which when viewed from the side shows sediment layers. For example, a physical sediment column can be obtained by taking a core sample from the bottom of the ocean. In this case, the sediment column refers to a virtual sediment column that can be spatially modeled in three dimensions in a geographic information system (GIS).

In block 106, a minimum stress is determined for each sediment layer in the sediment column. The minimum stress of each sediment layer can be determined based on the corresponding maximum void ratio and the relationship in FIG. 5. In block 108, a porosity model is generated for each sediment layer in the sediment column based on the mass of the overlying layers. The porosity models may be 1D, 2D, or 3D representations of the porosity characteristics of each sediment layer.

In block 110, the porosity models can be combined with measured data (e.g., Gradient-index (GRIN) acoustic properties and/or pore-fluid properties) of the sediment layers. GRIN optical properties describe the optical effects caused by a gradual variation of the index of refraction in the sediment layer. In block 110, the porosity models can be combined with measured data, (e.g. seafloor porosity measurements or vertical profiles of effective stress. Pore-fluid properties (e.g., velocity, density, compressibility, etc.) describe characteristics of the pore fluid in the sediment layer. The porosity models combined with the measured data generate self-consistent models (1D, 2D, or 3D) of the sediment layers. For example, a 1D layered model can be generated in cases where simple bearing capacity or quantifying vertical fluid flow is the objective. In another example, a 2D transect model can be generated where slope stability along a ridge is in question.

In block 112, the porosity models and sediment models are updated based on updated measured data. For example; if the measured data is soundspeed, the measured data can be obtained by two or more acoustic sensors positioned at the area of interest. In another example, if the measured data are actual void ratios, the measured data can be obtained by taking a core sample of the sediment. The porosity models and/or sediment models can be used for a variety of purposes such as environmental studies, engineering studies, hydrocarbon exploration, etc. For example, the sediment models can be used to improve acoustic sonar measurements of the seafloor, which are used to generate a 3D map of seafloor strength and consolidation state, important for managing hazards and safety in seabed operations and seafloor construction (e.g. offshore wind farms, moorings, undersea cables and pipelines).

Figure 2:
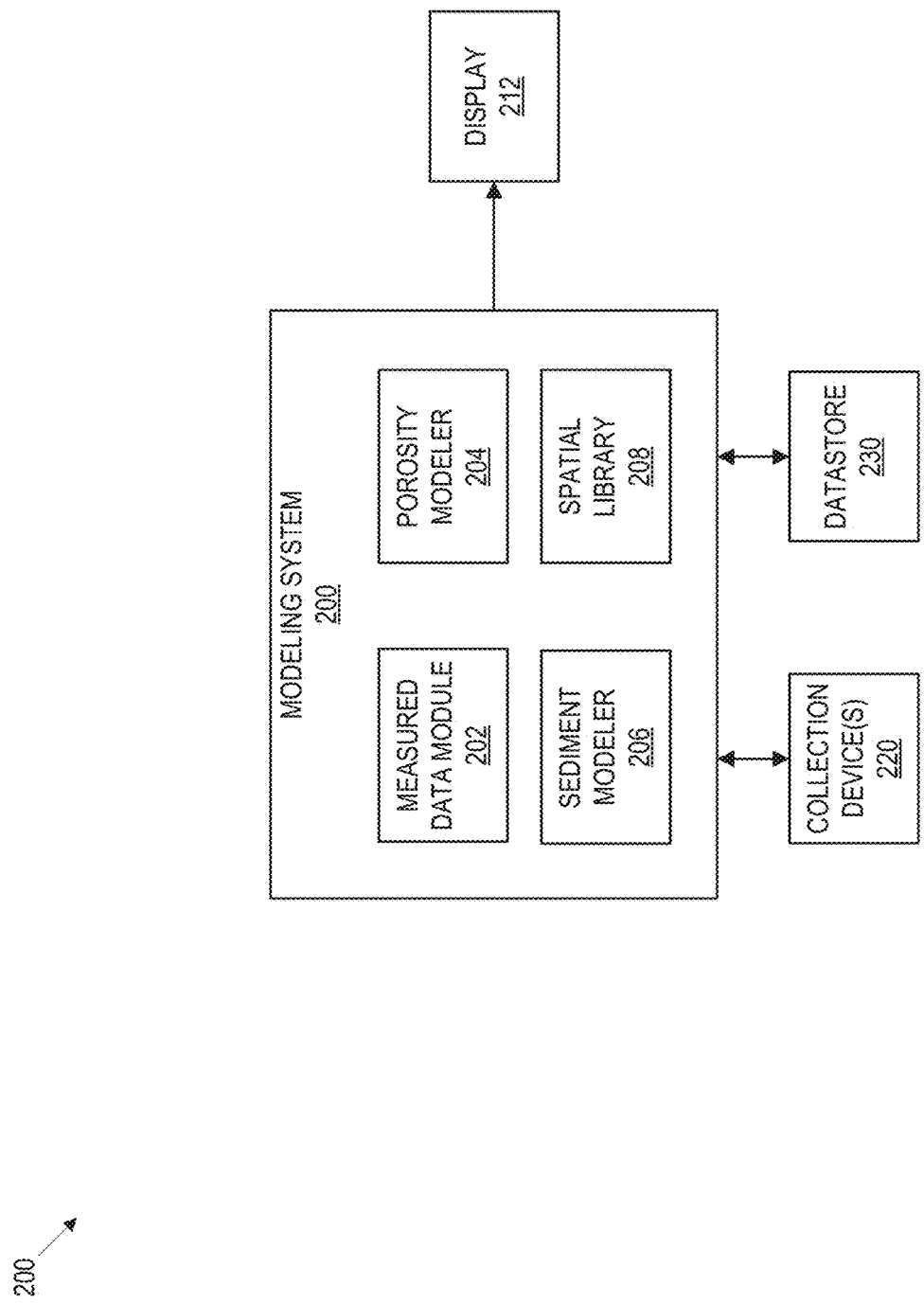
FIG. 2 is an example system for porosity prediction based on effective stress.

FIG. 2 is an example system 200 for porosity prediction based on effective stress. The system 200 includes modeling system 200, display 212, collection device(s) 220, and datastore 230.

Modeling system 200 is configured to model sediment at the floor of a body of water such as a lake, river, ocean, etc. Modeling system 200 includes measured data module 202, porosity modeler 204, sediment modeler 206, and a spatial library 208.

Measured data module 202 manages modeling system's 200 access to measured data collected by collection device(s) 220. Examples of measured data include, but are not limited to, geoacoustic properties (collected by acoustic sensors 220) and pore-fluid properties (collected by core sample(s) 220). Measured data module 202 can receive measured data from collection device(s) 220 and then store the measured data in datastore 230. In some cases, collection device(s) 220 are located at an area of interest so that measured data can be collected and provided to measured data module 202 in realtime.

Porosity modeler 204 is configured to generate porosity models (1D, 2D, or 3D). The porosity models may be generated as described above with respect to FIG. 1. Historical data for determining, for example, extrema void ratios for particular sediment layers in a sediment column can be retrieved from datastore. Porosity modeler 204 can use spatial library 208 to generate a 3D representation of porosity in each sediment layer of a sediment column.

Sediment modeler 206 is configured to generate sediment models (1D, 2D, or 3D). For example, the sediment models can be generated as described above with respect to FIG. 1. A sediment model for a sediment layer can be generated by combining a porosity model and measured data of the sediment layer. The measured data complements the porosity characteristics to create a more complete model of the sediment (e.g., a sediment model describing the porosity as well as how fluid acts within the sediment).

Spatial library 208 is configured to perform spatial operations on data layers and geospatial features. For example, spatial library 208 can be used to generate spatial features to be used in porosity and sediment models. In another example, spatial library 208 can be used to initially generate the virtual sediment column and sediment layers.

FIG. 3 is an example graph 300 showing the compaction behavior in e-log($\sigma$) space. Several recent, high-quality consolidation tests conducted on marine sediments in the Gulf of Mexico and the Nankai Trough have provided observations of void ratio 302 vs. the log of the vertical effective stress (e-log 10($\sigma$) curves) 304 for deep-water marine sediments. These observations were necessarily made ex situ on samples recovered at depth in the sediment column. FIG. 3 shows only the portion of the compression test data that represents the virgin compression curve, i.e., the stress as it would exist in situ.

Figure 4:
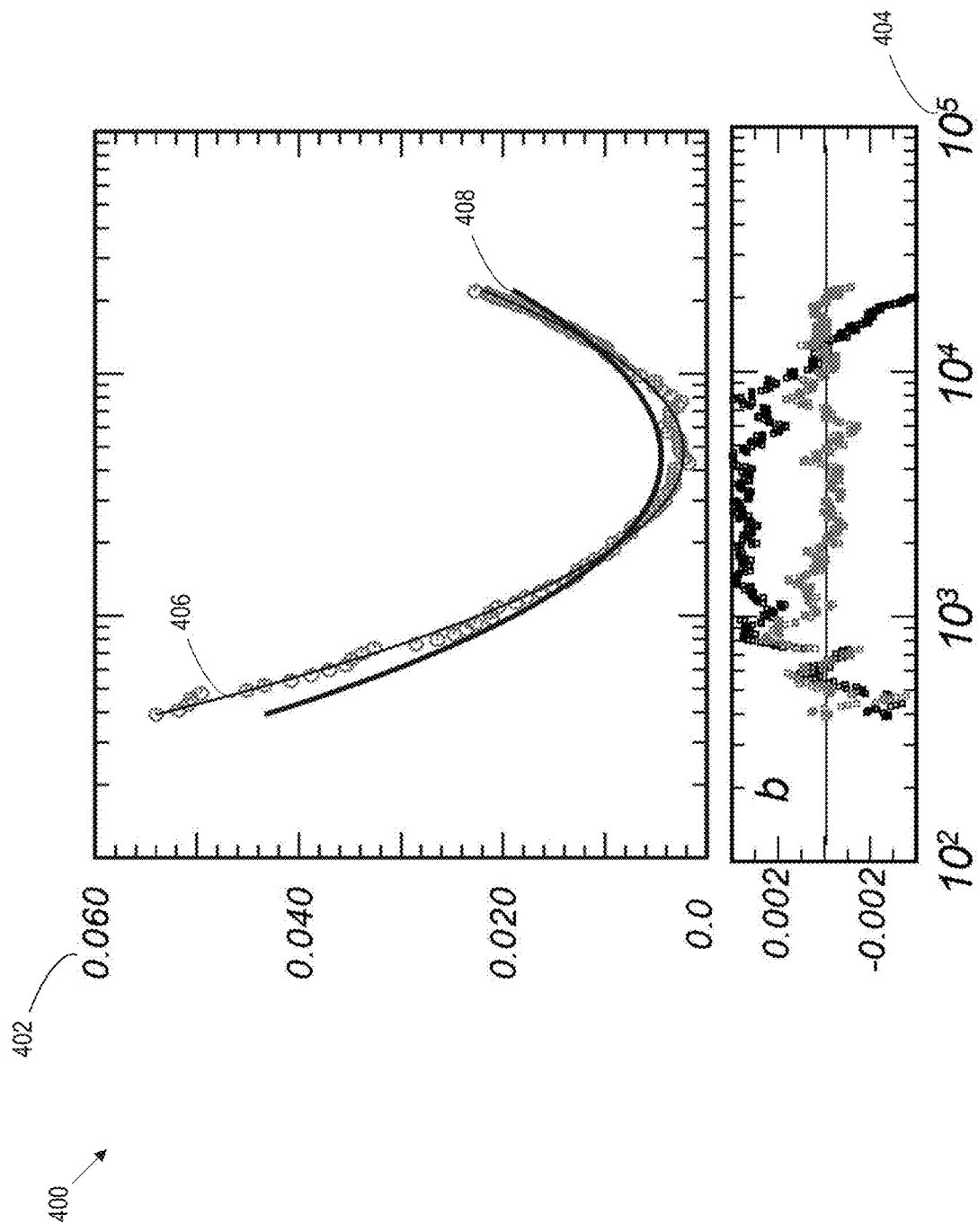
FIG. 4 is an example graph showing between typical models and models of the present invention.

The solid lines (between 306 and 308) in FIG. 3 were generated by fitting Equation 3c to the data using an annealing algorithm that minimizes the L1 norm of the error in void ratio. The fit from the model described herein better reproduces the concave upward character of the data, as shown by a comparison 400 of the residuals from the model described herein 406 and the best previous model 408 in FIG. 4. Note that any line of constant slope (constant $C_i$ in Equation 1) on the e-log$_{10}$($\sigma$) graph in FIG. 3 will at some point result in physically impossible negative values for the void ratio. Equation 3c not only more accurately models the observations from two disparate environments, but also ensures that void ratio ranges only between $e_o$ and $e_r$, as long as $\sigma > \sigma_o$, which is implicit in the definition of $\sigma_o$ as the minimum stress.

It is assumed that $e_o$, $e_r$, and $g_o$ depend uniquely on the grain shape and inter-grain forces, which in turn are characteristics of the sediment type (e.g. sand, silt, or clay). In the numerical fits of the present model, the range of $e_o$ values produced corresponds to $0.65 < \phi_o < 0.85$, with the siltier Nankai Trough samples consistently yielding lower initial porosities than the more clay-rich Gulf of Mexico (URSA) mudstones. The range of $e_r$ values produced corresponds to $0.3 > \phi_r > 0.05$, with the siltier Nankai Trough samples consistently yielding higher minimum porosities than the more clay-rich URSA samples. The correspondence of the parameter values produced by the numerical fit to the expected values for initial and minimum porosity in sediments of these lithologies supports the use of the present method in ocean sediments across an array of lithologies.

Figure 5:
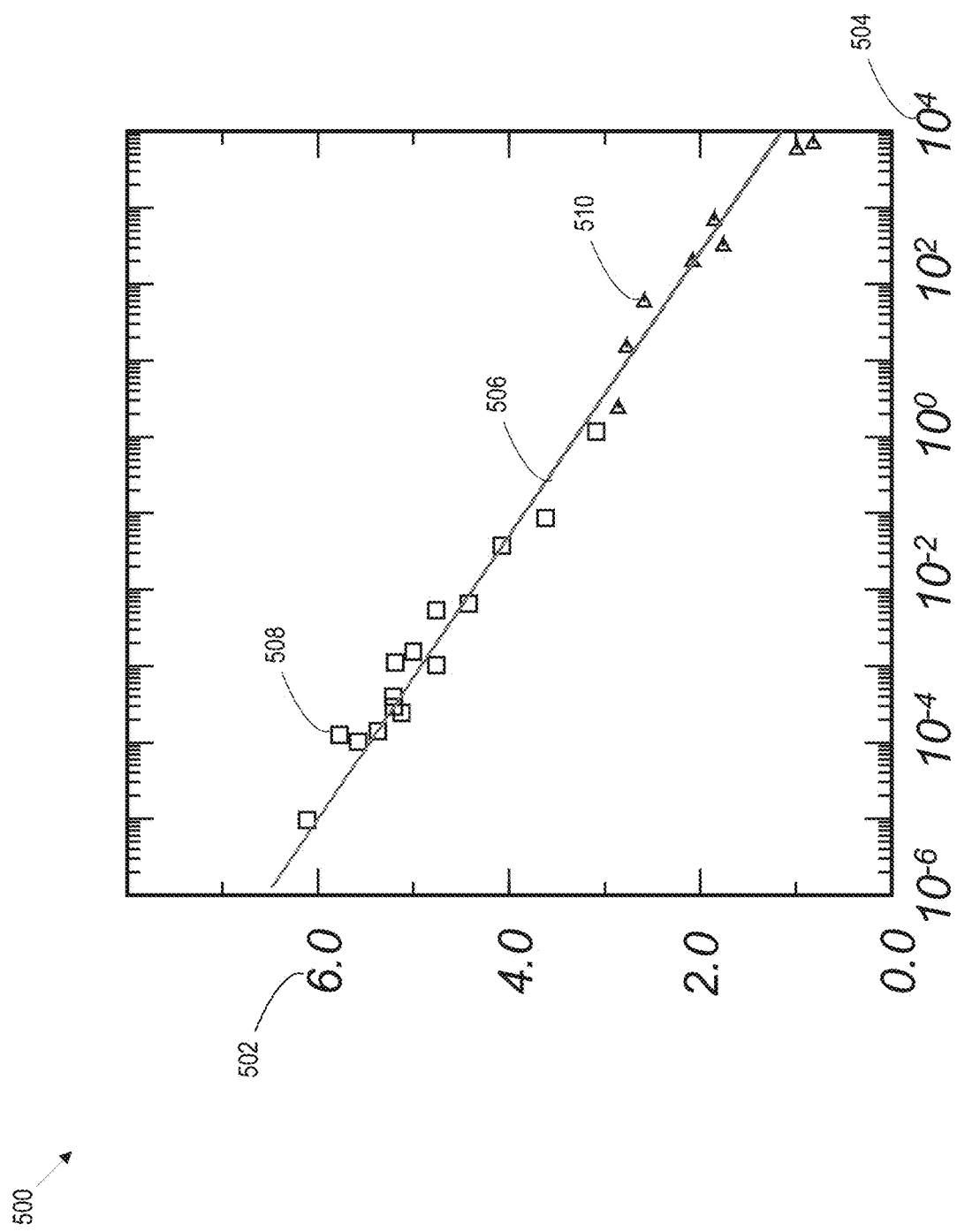
FIG. 5 is an example graph showing minimum void stress versus maximum void ratio.

The value of $\sigma_o$ (or $g_o$) is small (<$10^3$ kPa in the numerical fits) and yet finite. When the values of $e_0$ 502 and $\sigma_o$ 504 are plotted from the numerical fits for the Nankai trough 510 and URSA mudstones 508, the results 500 fall near a straight line 506 in e-log$_{10}$($\sigma$) space as shown in FIG. 5. Such an inverse relationship between initial void ratio 502 and initial vertical stress 504 at the 'critical' point where grains first begin to exert a stress on a framework of grains that are in contact is consistent with the models herein. The higher the porosity, the less dense the sediment is, and the lower the stress exerted by that sediment.

For the purposes of using the present compaction model in the absence of consolidation tests on physical samples, a log-linear relationship can be used to derive $\sigma_o$ from $e_0$, or simply assigning the hydrostatic pressure at the seafloor as $\sigma_o$.

With additional information about sediment properties such as composition or grain size, the model can be applied in more complex ways. Where sub-seafloor information exists, a separate e-log$_{10}$($\sigma$) relationship (constrained by the unique parameters $e_o$, $e_r$, and $g_o$) could be applied to each layer in a sediment column. The resultant porosity model can then be combined with grain and pore-fluid properties to generate a self-consistent model of a region of ocean sediments.

The depth and discharge predictions can be used to generate porosity models. The porosity models can be used for a variety of purposes such as environmental studies, navigation, hydrocarbon exploration, etc. In some cases, the porosity models can be continually updated with new measured data.

Figure 6:
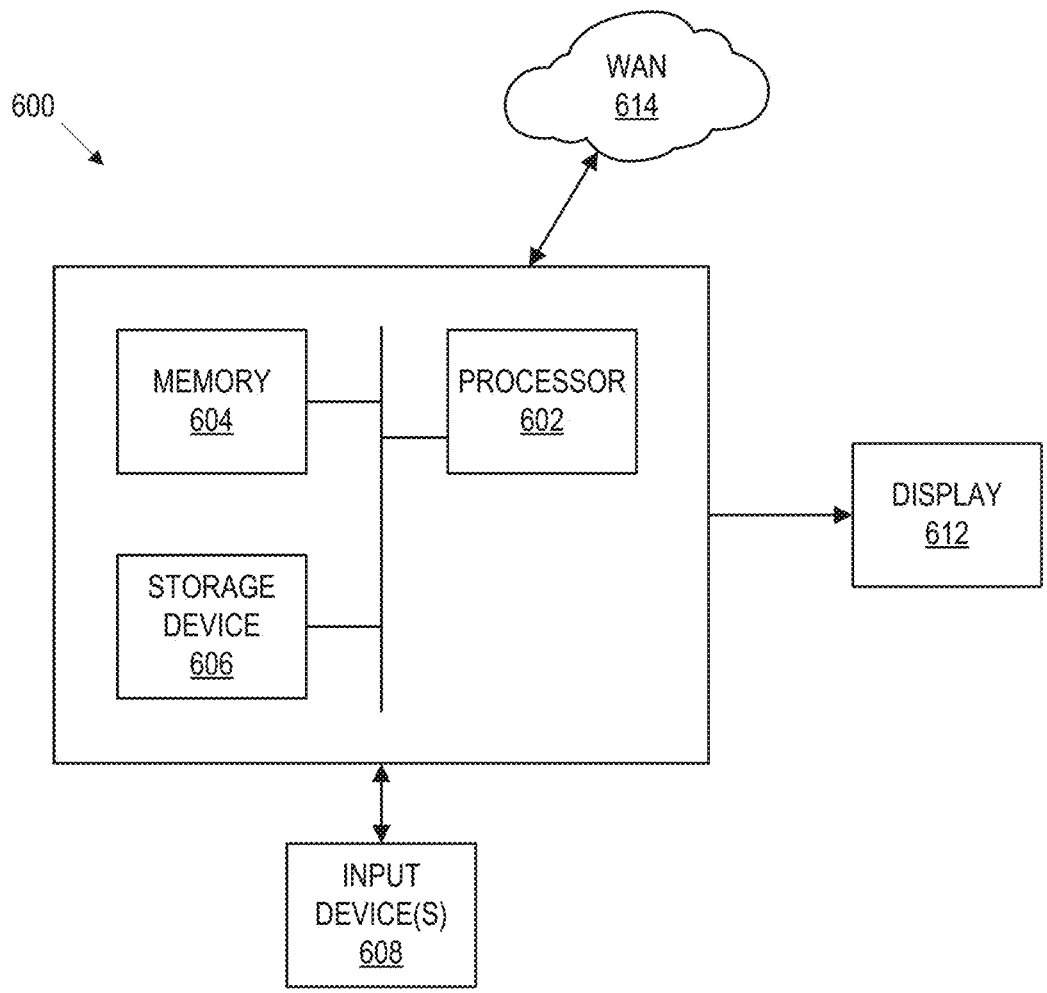
FIG. 6 is a diagram of an example computer system for porosity prediction based on effective stress.

Components of the invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention (e.g., measured data module, porosity modeler, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for generating a self-consistent sediment model, the method comprising:
   determining void ratio extrema for each of a plurality of sediment layers in a sediment column based on historical data or a direct measurement of the sediment column, wherein the void ratio extrema comprise a void ratio depositional maximum at a sea floor and a void ratio minimum residual at depth;
   determining initial stress for each of the plurality of sediment layers, wherein the inital stress is a function of the void ratio extrema, and wherein the void ratio extrema are defined by the void ratio depositional maximum at the sea floor, the void ratio minimum residual at depth, vertical stress, and initial stress at the sea floor, and wherein the void ratio ranges between the void ratio depositional maximum at the sea floor and the void ratio minimum residual at depth;
   generating a porosity model for each of the plurality of sediment layers based on the void ratio extrema and the initial stress;
   obtaining measured data for each of the plurality of sediment layers from a data collection device positioned at or near a geographic location of the sediment column;
   combining the porosity model of each of the plurality of sediment layers with the measured data of the sediment layer to generate the self-consistent sediment model for each of the plurality of sediment layers; and
   updating the porosity model and the self-consistent sediment model of each of the plurality of sediment layers based on updated measured data obtained from the data collection device.

2. The method of claim 1, wherein the initial stress is a function of the void ratio extrema as defined by:

$$e = \frac{1}{4(e_0 - e_r)}\log_{10}^2\left(\frac{\sigma_0}{\sigma}\right) + \log_{10}\left(\frac{\sigma_0}{\sigma}\right) + e_0$$

where e is the void ratio, $e_0$ is the void ratio depositional maximum at the sea floor, $e_r$ is the void ratio minimum residual at depth, $\sigma$ is vertical stress, and $\sigma_0$ is the initial stress at the sea floor.

3. The method of claim 1, further comprising performing a seafloor construction according to the self-consistent sediment model of each of the plurality of sediment layers.

4. The method of claim 1, wherein the measured data is acoustic properties and the data collection device is at least one acoustic sensor.

5. The method of claim 4, wherein the acoustic properties are gradient-index (GRIN) acoustic properties.

6. The method of claim 1, wherein the measured data is pore-fluid properties of a core sample and the data collection device is a core sampler.

7. A system for generating a self-consistent sediment model, the system comprising:
   a data collection device positioned at or near a geographic location of a sediment column, wherein the data collection device is configured to:
      obtain measured data for each of a plurality of sediment layers in the sediment column, and
      obtain updated measured data for each of the plurality of sediment layers in the sediment column; and
   processor coupled to a memory containing executable instructions, wherein execution of the executable instructions, by the processor, causes the processor to:
      determine void ratio extrema of a void ratio for each of the plurality of sediment layers in the sediment column based on historical data or a direct measurement of the sediment column, wherein the void ratio extrema comprise a void ratio depositional maximum at a sea floor and a void ratio minimum residual at depth,
      determine initial stress for each of the plurality of sediment layers, wherein the initial stress is a function of the void ratio extrema, and wherein the void ratio extrema are defined by the void ratio depositional maximum at the sea floor, the void ratio minimum residual at depth, vertical stress, and initial stress at the sea floor, and wherein the void ratio ranges between the void ratio depositional maximum at the sea floor and the void ratio minimum residual at depth;
      generate a porosity model for each of the plurality of sediment layers based on the void ratio extrema and the initial stress,
      update the porosity model of each of the plurality of sediment layers based on the updated measured data,
      combine the porosity model of each of the plurality of sediment layers with the measured data of the sediment layer to generate the self-consistent sediment model for each of the plurality of sediment layers, and
      update the self-consistent sediment model of each of the plurality of sediment layers based on the updated measured data.

8. The system of claim 7, wherein the initial stress is a function of the void ratio extrema as defined by:

$$e = \frac{1}{4(e_0 - e_r)}\log_{10}^2\left(\frac{\sigma_0}{\sigma}\right) + \log_{10}\left(\frac{\sigma_0}{\sigma}\right) + e_0$$

where e is void ratio, $e_0$ is the void ratio depositional maximum at the sea floor, $e_r$ is the void ratio minimum residual at depth $\sigma$ is vertical stress, and $\sigma_0$ is the initial stress at the sea floor.

9. The system of claim 7, further comprising a spatial library for generating a seafloor construction plan based on the self-consistent sediment model of each of the plurality of sediment layers.

10. The system of claim 7, wherein the measured data is acoustic properties and the data collection device is at least one acoustic sensor.

11. The system of claim 10, wherein the acoustic properties are gradient-index (GRIN) acoustic properties.

12. The system of claim 7, wherein the measured data is pore-fluid properties of a core sample and the data collection device is a core sampler.

13. A method for generating a sediment model, the method comprising:
   determining a void ratio depositional maximum at a sea floor and a void ratio minimum residual at depth for each of a plurality of sediment layers in a sediment column;
   determining a minimum stress for each of the plurality of sediment layers based on a corresponding maximum void ratio, wherein the corresponding maximum void ratio is defined by the void ratio depositional maximum at the sea floor, the void ratio minimum residual at depth, and vertical stress, wherein the maximum void ratio ranges between the void ratio depositional maximum at the sea floor and the void ratio minimum residual at depth;

generating a porosity model for each of the plurality of sediment layers based on the minimum stress; and combining the porosity model of each of the plurality of sediment layers with measured data for each of the plurality of sediment layers.

14. The method of claim 13, wherein the void ratio depositional maximum of each sediment layer is a void ratio depositional maximum of each sediment layer at the sea floor, and wherein the void ratio minimum residual of each sediment layer is a void ratio minimum residual of each sediment layer at depth.

15. The method of claim 13, further comprising:
determining a critical porosity that corresponds to the void ratio depositional maximum for each of a plurality of sediment layers.

16. The method of claim 15, further comprising:
determining a residual porosity that corresponds to the void ratio minimum residual for each of a plurality of sediment layers.

17. The method of claim 16, wherein the critical porosity is a porosity at which sediment in each sediment layer falls out of suspension, and wherein the residual porosity is a porosity at which grains in each sediment layer have been re-arranged to a maximum packing efficiency.

18. The method of claim 15, further comprising determining a vertical effective stress at the critical porosity.

19. The method of claim 18, further comprising generating the porosity model based on the critical porosity and the vertical effective stress.

20. The method of claim 13, wherein determining the minimum stress for each of the plurality of sediment layers includes determining the minimum stress based on the corresponding maximum void ratio being defined by:

$$e = \frac{1}{4(e_0 - e_r)} \log_{10}^2\left(\frac{\sigma_0}{\sigma}\right) + \log_{10}\left(\frac{\sigma_0}{\sigma}\right) + e_0$$

where $e$ is the maximum void ratio, $e_0$ is the void ratio depositional maximum at the sea floor, $e_r$ is the void ratio minimum residual at depth, $\sigma$ is vertical stress, and $\sigma_0$ is initial stress at the sea floor.

* * * * *